J. MERRITT.
CONNECTING LINK AND PROCESS OF MAKING SAME.
APPLICATION FILED JULY 28, 1908.
956,394.
Patented Apr. 26, 1910.
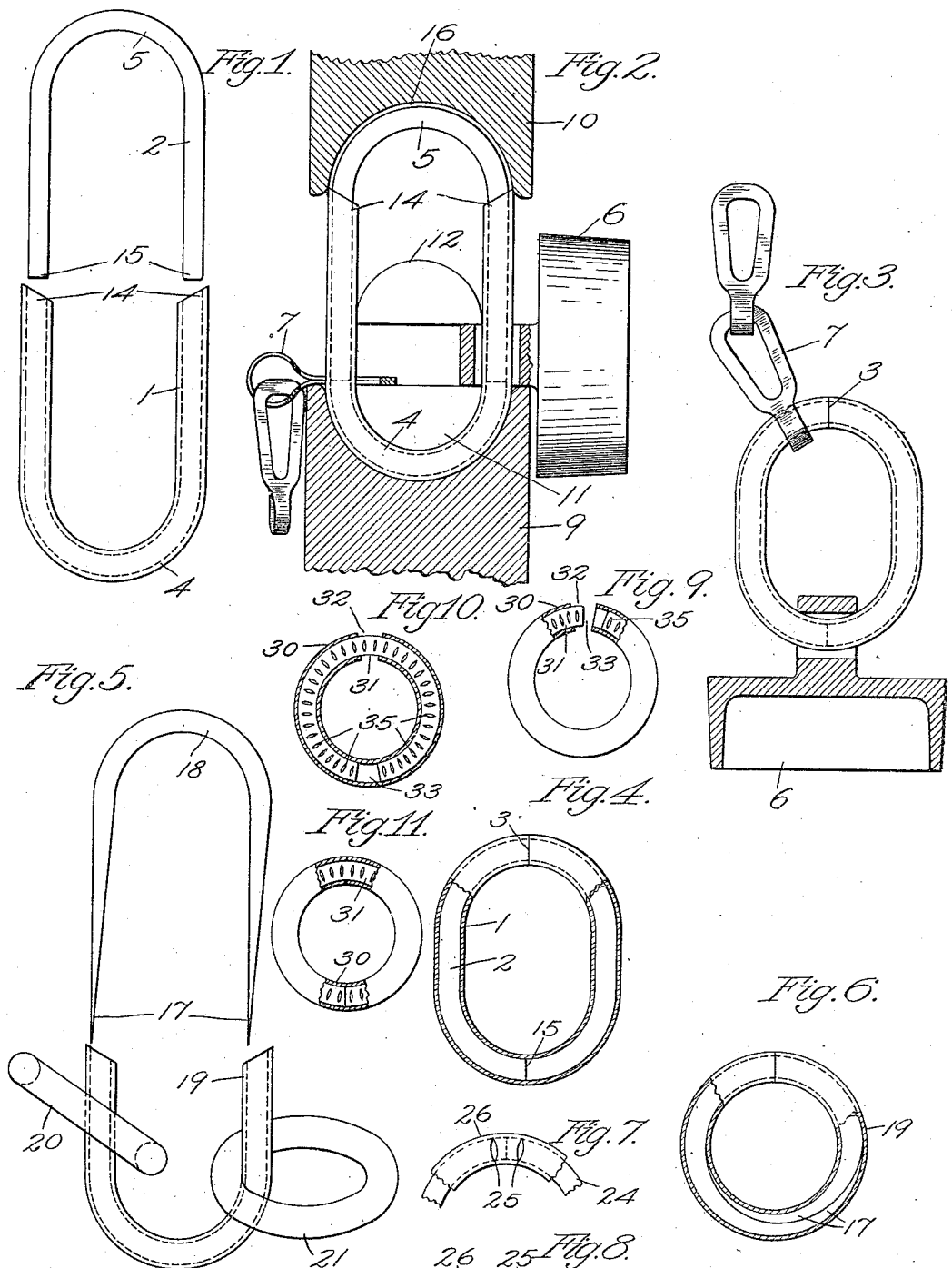
Witnesses.
Charles H. Storrs
Edward H. Lorenz
Inventor.
Joseph Merritt.
per
Wm H. Storrs.
Attorney.

UNITED STATES PATENT OFFICE.

JOSEPH MERRITT, OF HARTFORD, CONNECTICUT.

CONNECTING-LINK AND PROCESS OF MAKING SAME.

956,394.     Specification of Letters Patent.     Patented Apr. 26, 1910.

Application filed July 28, 1908. Serial No. 445,755.

*To all whom it may concern:*

Be it known that I, JOSEPH MERRITT, a citizen of the United States, and resident of Hartford, in the county of Hartford and State of Connecticut, have invented certain new and useful Improvements in Connecting-Links and Processes of Making the Same, of which the following is a full, clear, and exact specification.

This invention relates to an improved connecting link for chains, pendants and various attachments, and to an improved process of making the same. It may be employed for a great variety of purposes wherever it is desirable to unite or articulate various forms of chains, lockets, pendants, snap hooks, swivels, etc., in the jewelry and other trades. It may also be used extensively in attaching various plumbing fixtures to chains or other connections; and in short wherever it is desired to permanently and securely articulate parts and devices together. It may also be used for attaching various handles, pulls, and other trimmings of furniture. One of its most important advantages is that it is or may be made and sold in open or separable form, and permanently secured or fixed without being soldered, after being articulated with or between the parts which are to be joined by it; inasmuch as there are many articles in which it is either undesirable or impracticable to solder the parts together, on account of the liability of unsoldering, discoloring, or otherwise injuring the structure or appearance of the adjacent links or other parts.

Figure 1 of the drawings may be considered a side view, showing the two members of one form of this invention separated, and in the relative position in which they are put together. Fig. 2 is a similar view of the sections or parts of Fig. 1, pushed partway together, a pair of suitable dies for the performance of the process of closing them being also shown in section taken in the plane of the link, and illustrating the operation of joining a drain plug to its chain. Fig. 3 is a similar view of the link of Figs. 1 and 2 after the completion of the process of closing the link, showing also its attached plug and chain. Fig. 4 is a similar view, showing the link of the previous figures, with its outer tubular sheath or envelop shown partly in section. Figs. 5 and 6 are plan views, illustrating a form of link in which the inner joining and reinforcing member is beveled or tapering at its ends so that they will overlap each other when closed or clenched. Fig. 5 shows this form of link with its two parts in their open attaching position, illustrating them as joining two links of a chain. Fig. 6 shows the same link in its closed-together position, the two chain links being, however, omitted in this case, and the outer tubular casing or envelop being shown in section, so as to show more clearly the overlapping ends of the inner ring. Fig. 7 is a side view and Fig. 8 is an edge view showing a fragment of a ring provided with lateral notches or depressions into which the adjacent parts of the tubular casing are forced or deformed so as to more securely resist any tendency to open the ring. Figs. 9, 10 and 11 are side views illustrating one of these connecting links, also provided with lateral depressions, and of a form in which the ring may be left partly open for the insertion of whatever may be joined together by it. Fig. 9 shows the ring in its open position, with the respective joints of its two members in substantial coincidence. Fig. 10 represents the inner ring partly turned, as it would be after the insertion of the links to be joined, and Fig. 11 illustrates the same ring in its fully closed-together position.

Figs. 1, 2 and 3 show an elongated or elliptical form of this improved link, and illustrates the process of closing the link in connecting a drain plug and its attaching chain. The link illustrated in these figures consists of the tubular outer member 1, constituting a sheath or envelop, and the inner connecting and reinforcing core member 2. These two members may be of any desired metal, according to the purposes to be served. For jewelry and other purposes where appearance and finish is important, the outer sheath or envelop 1 may be of the same metal as the parts to be joined, while the inner or core member 2 may be of a baser metal, each having whatever characteristics of stiffness, non-corrosion, flexibility, color, design, etc., that may be desired. This inner member may be a solid rod or wire, as herein shown, or it may be hollow or tubular. The outer enveloping member 1 is preferably in the form of seamless tubing, in which case only a single lateral joint 3 will be visible, and even this can be so closely fitted as to be barely discernible, by suitably shaping the ends to compensate for the changes due to the operation of closing the link together. Obviously, however, either or both of the members 1 or 2 may be made of tubing of any obtainable form.

The outer and inner members 1 and 2 are preferably, as herein shown, made of a U-shaped form, the bends or curved portions 4 and 5 of which are or may be of the final dimensions and form required. This, however, is not important, since the link may be re-formed in any desired way after it is finally clenched together.

The process of joining and closing these rings is illustrated in Figs. 1, 2 and 3, in connection with the articulating of an ordinary drain plug 6 and its chain 7, which are slipped over the open ends of one of the members 1 and 2, after which the said members are pushed together from the position shown in Fig. 1 to that shown in Fig. 2. From this point the process of closing the link can most easily and perfectly be performed by a mechanical device, such for example as the dies 9 and 10, which are suitably recessed for receiving the ends of the link, and the articles to be joined by them. Inside pieces 11 and 12 fitting the inner portions of the rings are also preferably employed and may be appurtenant to the dies 9 and 10, or to one of them. Considerable latitude will be found permissible and desirable in selecting and adapting the dies or other appliances to different forms and classes of work to be done.

Having placed the link members 1 and 2 and the plug and chain 6 and 7 in the dies in the position shown in Fig. 2, the dies 9 and 10 are closed toward each other, carrying the parts of the ring to the position shown in Fig. 3, from which figure, however, the dies are left out for the sake of clearness. During the movement of the dies toward each other, the leading ends 14 of the tubular sheath follow the contour of the inner member 2, and the leading ends 15 of the inner member 2 follow the contour of the sheath, thus clenching the two parts together by crooking or bending them out of parallel relation to each other, and particularly to their line of joining and separating movement, so that it would be necessary to straighten the bent or clenched ends out again approximately to their position shown in Fig. 1, in order to fully open the ring.

It is usually desirable, and in some cases essential, to make a close fitting joint 3 where the leading ends 14 of the outer envelop member 1 meet. In such cases, the ends 14 should be previously shaped so as to come together properly. The required form will be approximately a bevel, such as is shown in Figs. 1 and 2; but the exact form may be determined by experiment for different metals and for various dimensions of the parts. This is also true of the leading ends 15 of the inner member 2, when it is desired to have these ends fit together closely, which may be desirable, especially when employing an extremely thin outer envelop, so as to fully and solidly reinforce that envelop.

In Fig. 2 the annular space 16 between the die and the member 1 for receiving the corresponding portion of the outer wall of the member 2 is shown to be parallel. In practice, however, especially when employing fairly stiff metal, a portion 5 of the member 2 will, at least at the beginning of the closing operation, generally settle back at the point designated by 16, against the corresponding portion of the die, separating again, however, as the ends 14 of the outer member approach their completed condition. In some cases it may be found necessary to provide or insert a filling piece at the point 16 to preserve the annular space for the leading ends 14 of the tube until they nearly reach their closed position, at which time the filling piece may be withdrawn or moved aside to permit the completion of the operation. Such modifications and adaptations will, however, be found to be within the expected skill of the die-maker and metal worker.

The form of link shown in Figs. 5 and 6 differs from that of the previous figures, chiefly in the respect that the completed ring is circular, and that the ends 17 of the inner member 18 are beveled or tapering so as to overlap each other when in their complete or clenched form shown in Fig. 1. The outer or sheath member 19 is made of the same general form and character as the outer member 1 of the previous figures, and may be closed together by a die similar to that shown in Fig. 2. This modification is illustrated as being employed for connecting together the links 20 and 21, which, however, are merely representative of any objects which it may be desired to join together.

Figs. 7 and 8 illustrate a method of still further securing the outer and inner sections of any of these links together, in addition to whatever natural stiffness may be inherent in the metal itself. The inner member 24 is provided with lateral notches or depressions 25, into which the adjacent outer portions of the outer sheath or envelop member 26 are forced, after being brought to their final clenched-together position. The location of the notches 25 should be selected with reference to the characteristics and requirements of the respective links. For example, in the case of jewelry it is generally desired to locate them where the corresponding bends or depressions of the outer tube or envelop will be out of sight in the finished production.

Although these links may be made and closed together by inexpensive and hand-operated apparatus, it will, as in the case of most other manufactures, be found advantageous to carry the manufacture as far as possible in a manufactory employing fairly skilled die-makers and metal workers, and adequate machinery. A form of link which may be very nearly completed in such a manufactory, leaving comparatively little to be done by hand or similar apparatus, after attaching it to the articles to be connected, is shown in Figs. 9, 10 and 11. The outer and inner members 30 and 31 are by the process described herein and illustrated in the previous figures carried to the stage of completion shown in Fig. 10, leaving the ends of the members separated as shown at 32 and 33, respectively, and making them fit loosely enough together so that one will slide within the other. When used they are turned to the position shown in Fig. 9 with their respective openings 32 and 33 in coincidence for the insertion of the articles to be joined, after which the parts or sections are turned again to the position shown in Fig. 10. They may be then placed in a suitable closing apparatus, for example, on the principle of that illustrated in Fig. 2, closed to the position shown in Fig. 11. The link illustrated in Figs. 9, 10 and 11 is shown to be provided with lateral depressions or notches 35, into one or more of which the wall of the outer or envelop member may be depressed, as shown in Fig. 8, the location being chosen with reference to the purposes for which the link is to be employed.

By suitable modifications in the form and arrangement of these links and by suitable adaptations of the apparatus employed for carrying out the process of closing the links, they may be adapted to a great variety of uses, particularly in the jewelry, plumbing and hardware trades; and in fact wherever it is desirable to permanently secure together component parts of a link, loop, handle, pull, or other appurtenance or attachment.

The notches or depressions 35 and 25 facilitate turning the inner ring relative to the outer ring, for opening and closing them to and from the position shown in Figs. 9 and 10, for which purpose the depressions may most advantageously be expanded at suitable intervals around the inner ring, as shown at Fig. 10. These notches or depressions may, as illustrated in Fig. 8, also be utilized for securing the two sections of the ring together in their final position. A similar effect may be obtained merely by depressing the outer wall against and into the surface of the inner ring, especially when the latter is of comparatively soft metal, the point or depression being located where it is least noticeable from the outside; as for example, on the inner circumference of the ring. Although it is an important advantage of this ring that it may be permanently secured without being notched or soldered, yet a still greater security may be obtained by thus notching or interlocking the inner and outer members together, or by soldering or "sweating" them together, where the conditions call for or permit of soldering or "sweating" operations. In such cases the parts may be "tinned" or flowed with a thin film of solder by the manufacturer, and put upon the market in that condition, so that it is only necessary to heat the parts after putting them together, to a sufficient degree to melt the solder, and thereby firmly solder as well as interlock them. In such cases the dies or other closing instrumentalities may be maintained at a degree of heat sufficient to melt the solder, so that the closing and soldering operations may be simultaneous, or nearly so.

I claim as my invention:—

1. The process of securing link members together, which consists in forcing the end of one member within the end of another member and deforming the said ends to prevent their separation.

2. The process of uniting open-ended link members, which consists in forcing one of the ends within another end and deforming both of the portions thus united to hold them together.

3. The process of uniting link members, which consists in forcing one of said members within another member, one of said united members being provided with a lateral depression into which a portion of the other member is forced laterally to prevent retracting movement of the two members.

4. The process of joining open-ended link members together, which consists in shaping one end to fit within another end of said members, forcing the first of said members into the second of said members and then deforming a portion of the wall of the outer member into a lateral depression of the inner members.

5. The process of connecting the ends of a tubular link member, which consists in pushing the ends of a connecting piece into the ends of the tubular link member, and curving the ends of the said connecting piece.

6. The process of connecting the ends of a tubular link member, which consists in pushing the ends of a curved connecting piece into the ends of the said tubular link member, and bending the said ends upon the curved portion of the connecting piece.

7. The process of connecting and reinforcing the open ends of a tubular link member, which consists in pushing the ends of a curved connecting piece into the open ends of the tubular member, and thereby bending the walls of the said tubular member into conformity with the curvature of the connecting piece.

8. The process of connecting the ends of a tubular link member to form an endless ring, which consists in pushing the ends of a curved connecting piece into the open ends of the tubular member, and forcing the ends of each piece into conformity with the adjacent portions of the other piece.

9. The process of forming a connecting link, which consists in pushing the ends of a U-shaped wire into the open ends of a U-shaped tubular member, and forcing the two together, bending them into conformity.

10. The process of connecting and sheathing the ends of a link member, which consists in pushing a tubular sheath over the ends of the said link member, and bending the said ends within the sheath by the pushing movement of the sheath.

11. The process of connecting and sheathing the ends of a link member, which consists in pushing a tubular sheath over the ends to be connected, and bending the said ends by the pushing movement of the sheath until they substantially meet within the tubular sheath.

12. The process of uniting the ends of a link member, which consists in pushing a tubular sheath over the ends of the said link member, and bending the said ends within the sheath by the pushing movement of the sheath until the said ends meet and overlap each other.

13. The process of connecting the ends of a link member, which consists in pushing a curved tubular sheath over the ends of the said link member and bending the said ends within the curved portion of the sheath.

14. The process of connecting the ends of a link member, which consists in pushing a curved tubular sheath over the ends of the said link member, and bending the said ends within the curved portion of the sheath until they meet and overlap within the said curved portion.

15. The process of connecting and sheathing a link member, which consists in pushing a tubular sheath over the ends of the said link member, the ends of the said sheath being inclined to make a close joint when said ends are bent together.

16. The process of enveloping a link member, which consists in pushing a curved tubular envelop over the ends of the said link member and bending the said ends within the tubular envelop into substantial conformity with the curve of the envelop.

17. The process of connecting and enveloping the ends of a link member, which consists in pushing a curved tubular envelop over the said ends, and bending the said ends within the tubular envelop in conformity with the curve of the envelop, the ends of the latter being previously inclined to make a close joint when completed.

18. An endless link, consisting of a two-ended inner member having its ends approximately joined and a two-ended outer member enveloping the said inner member and having its ends approximately joined and out of coincidence with the joined ends of the inner member.

19. A link, comprising a tubular member, an inner connecting and reinforcing member joining the ends of the outer tubular member and having its own inner ends curved and overlapping each other within the outer tubular member.

20. A link, consisting of an outer tubular sheath, an inner connecting and reinforcing member joining the ends of the sheath and having its own ends bent and overlapping each other within the said sheath, the sheath being seamless except for its jointed ends.

21. A link, comprising an inner loop, and an outside tubular sheath enveloping the inner loop and having its ends abutting in a close fitting end joint.

22. A link, provided with an outer tubular sheath, and provided with indentations into which portions of the sheath are deformed to prevent separating movement.

23. The process of forming an endless link member from an open-ended sheath and an open-ended core, which consists in providing the ends of the core with solder, forcing the said ends into and deforming them within the other member and heating the said solder sufficiently to solder the said members together.

In testimony whereof I have signed my name to this specification this 27th day of July, 1908.

JOSEPH MERRITT.

Witnesses:
D. B. WESTIN,
FRANK M. MATHER.